United States Patent

[11] 3,593,650

[72] Inventors John C. Martin;
Eugene G. Rescho, both of Springfield, Ill.
[21] Appl. No. 3,013
[22] Filed Jan. 15, 1970
[45] Patented July 20, 1971
[73] Assignee Bunn-O-Matic Corporation
Springfield, Ill.

[54] URN-TYPE COFFEE BREWER
14 Claims, 16 Drawing Figs.
[52] U.S. Cl. ................................................. 99/291,
99/307
[51] Int. Cl. ......................................................... A47j 31/14
[50] Field of Search ............................................ 99/291,
300, 302, 299, 303, 304, 307

[56] References Cited
UNITED STATES PATENTS
2,565,235  8/1951  Johnson .................... 99/291 X
3,149,556  9/1964  Martin ....................... 99/305 X
3,261,280  7/1966  Kaplan ...................... 99/291
3,374,897  3/1968  Martin ....................... 99/304
3,520,247  7/1970  Hester ....................... 99/291

Primary Examiner—Robert W. Jenkins
Attorney—Robert R. Lockwood

ABSTRACT: Urn-type coffee brewer has a tank having a cover from which a pair of coffee extract receptacles depend into hot water in the tank. Each receptacle has a downwardly stepped apertured plastic cover for receiving over a limited area a correspondingly stepped plastic funnel on which a ground coffee carrying filter is placed. The funnel is arranged for two hand manipulation. A plastic funnel cover overlies the funnel on one receptacle and a duplicate cover overlies the other receptacle. A spray head is detachably mounted underneath an apertured cup-shaped formation on the funnel cover and is supplied with hot water from the tank by an electric motor driven pump controlled by a timer which determines the length of the brewing cycle. Flow of water to the tank is controlled by a solenoid valve in accordance with the water level in the tank at a rate that is less than the rate of outflow of hot water to the spray head. L-shaped thermostatically controlled electric heating elements maintain the water in the tank at a predetermined temperature. A continuously energized heater in the tank compensates for heat loss therefrom. A replaceable panel has mounted thereon the motor driven pump and timer therefor, the valve and its water level control, the heating elements and thermostat controls, and the continuously energized heater.

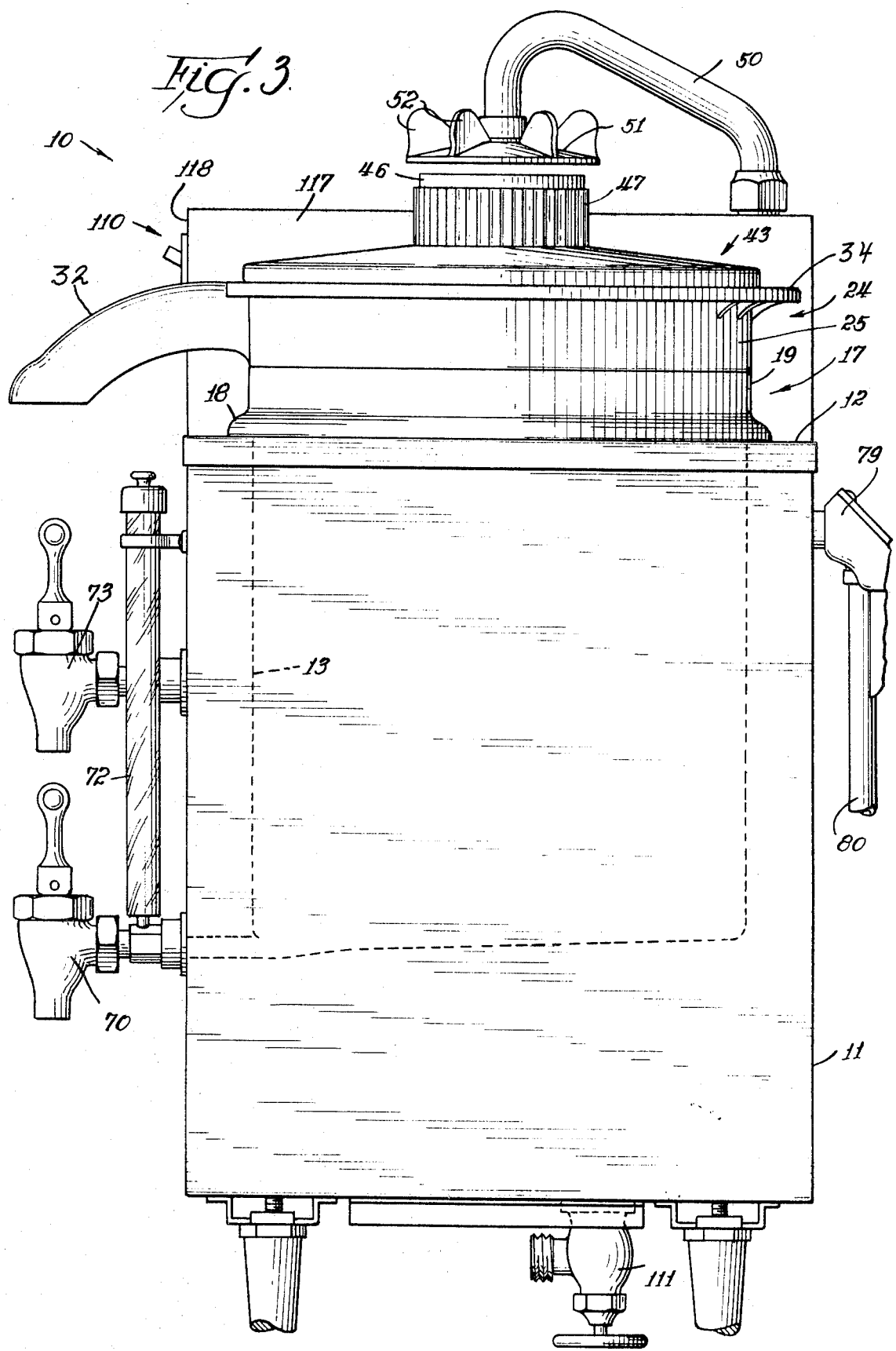

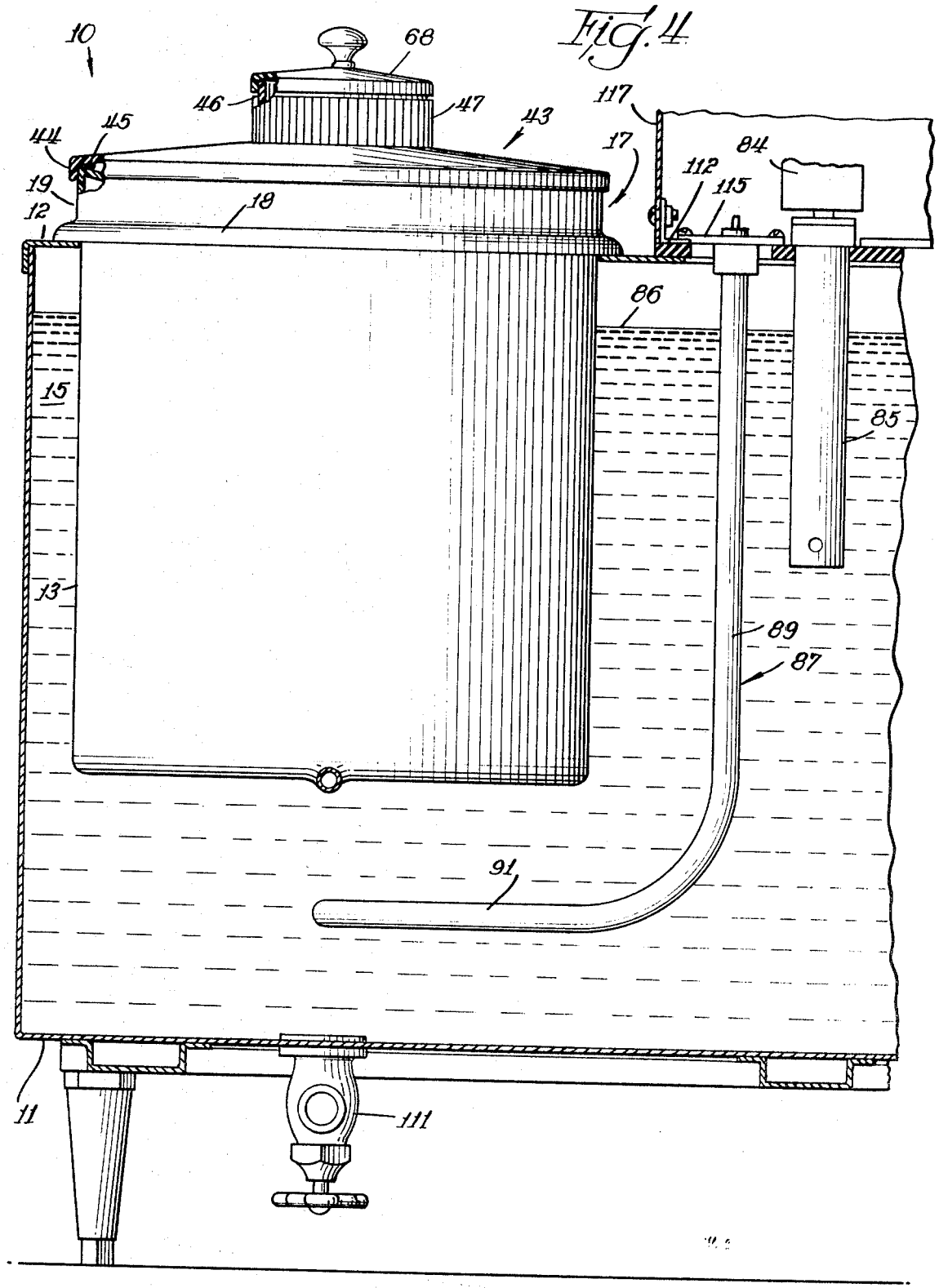

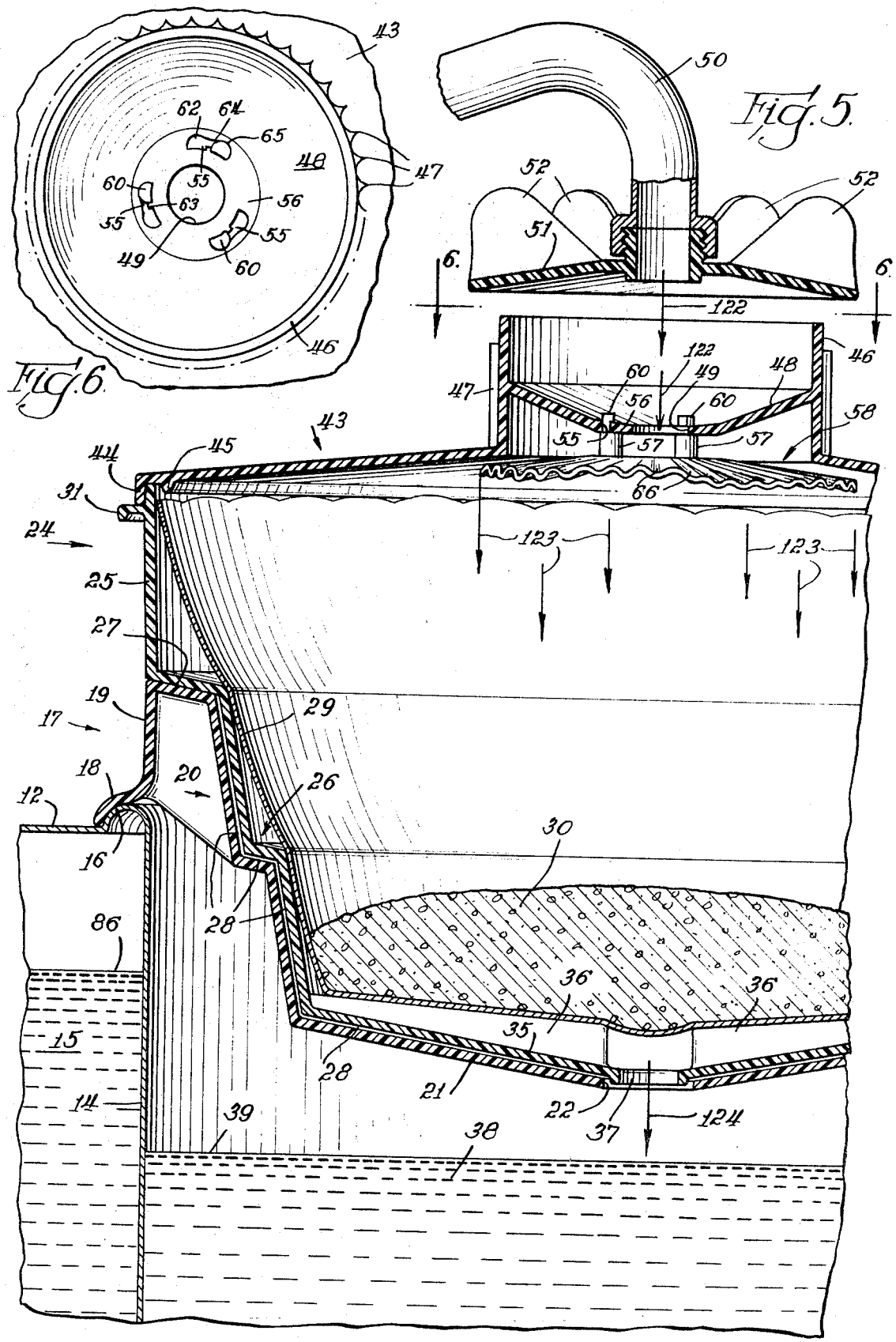

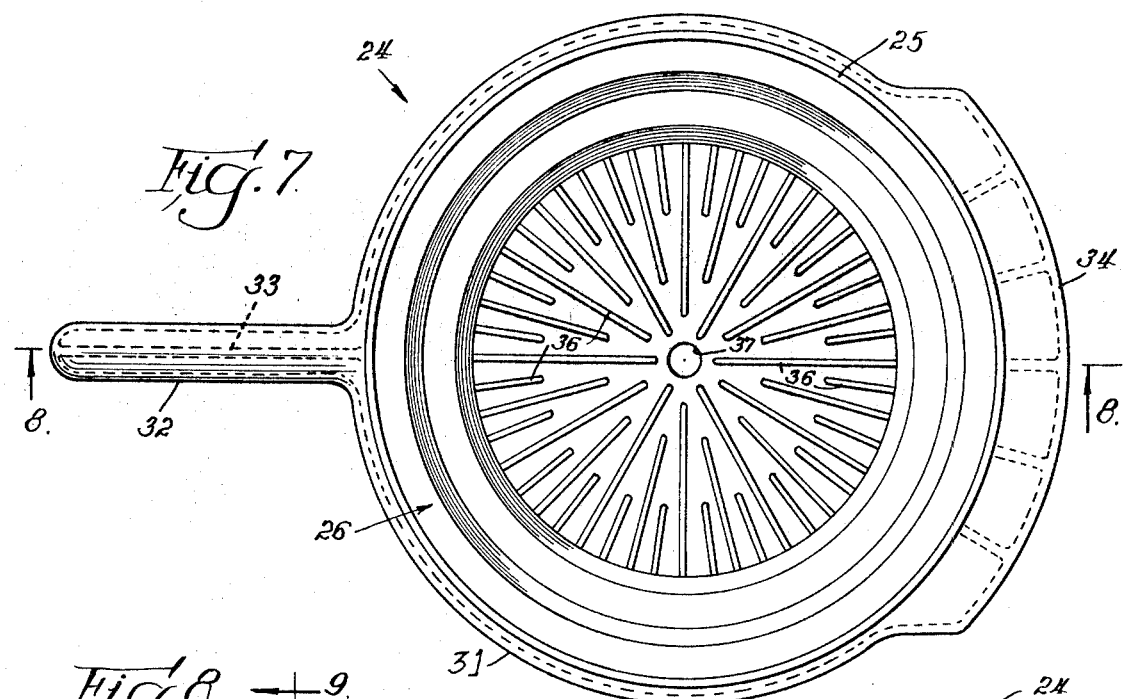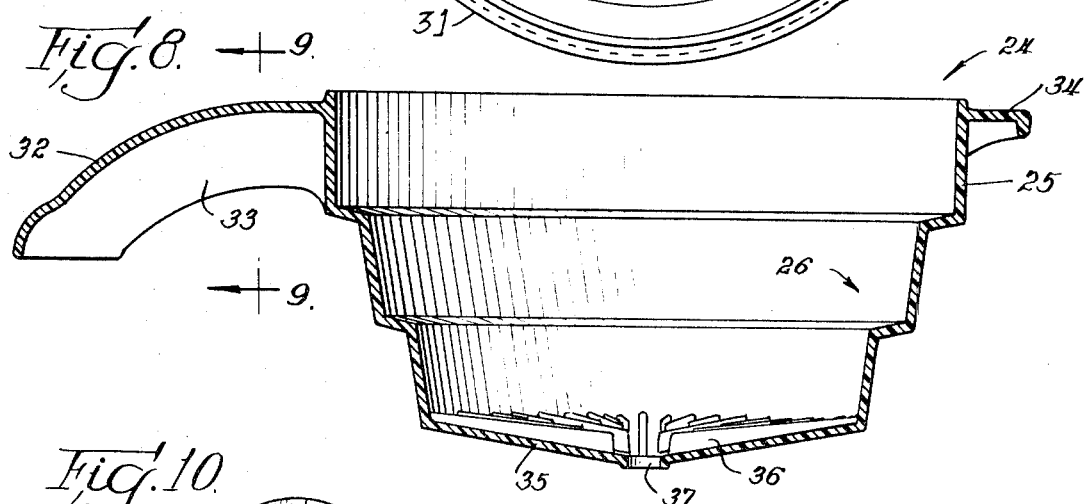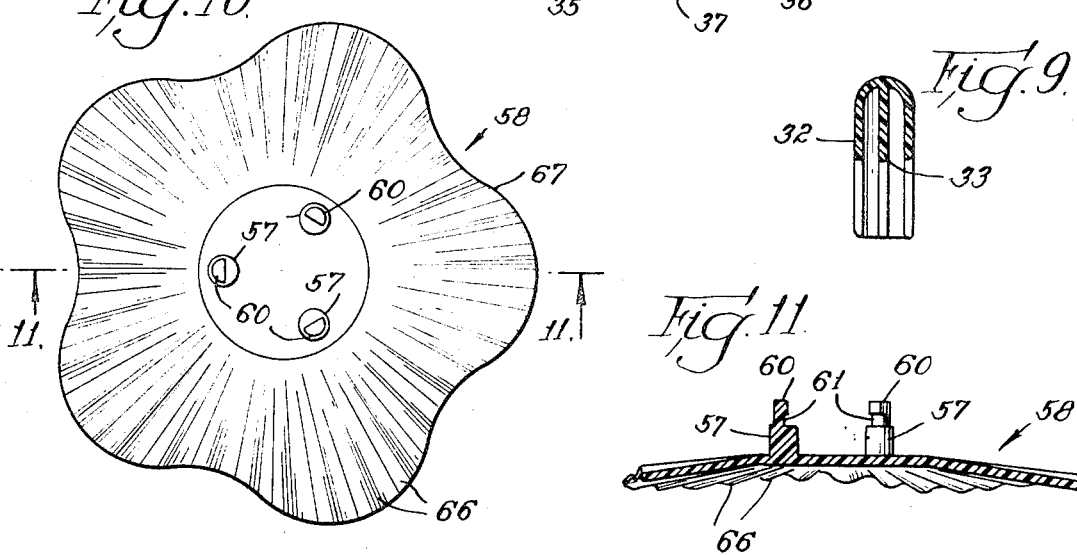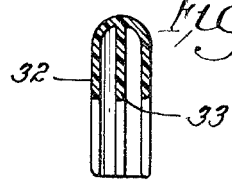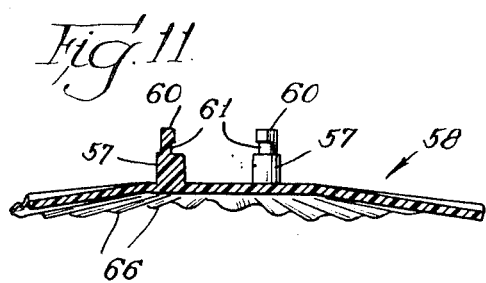

3,593,650

1

URN-TYPE COFFEE BREWER

The urn-type coffee brewer disclosed herein is an improvement over the coffee making machine of J. S. Martin, U.S. Pat. No. 3,149,556, issued Sept. 22, 1964, and employs certain of the features of the funnel of J. C. Martin U.S. Pat. No. 3,374,897, issued Mar. 26, 1968.

For brewing coffee extract on a relatively large scale it is customary to employ a pair of coffee extract receptacles in a tank of hot water which is supplied from a suitable source and is sprayed over ground coffee during the coffee brewing cycle. Coffee extract is withdrawn from one receptacle while the brewing operation is being accomplished for the other receptacle. It is desirable to construct such coffee brewing apparatus such that it can be utilized with a minimum of effort and the brewing cycle initiated and completed simply and efficiently. Also this apparatus should be constructed in such manner as to minimize leakage and to facilitate servicing and replacement of parts that may become defective.

Among the objects of this invention are: To construct an urn-type coffee brewer for use with a funnel arranged to discharge a relatively high velocity stream of coffee extract into a coffee extract receptacle and agitate the coffee extract therein; to cover each receptacle and provide a support for the funnel having a relatively small area contact therebetween; to provide the same cover for the funnel and for the receptacle cover on the receptacle containing coffee extract; to removably mount a spray head centrally on the underside of the funnel cover; to provide a timed control for an electric motor driven pump that delivers hot water from a tank in which the receptacles are immersed to the spray head; to control the operation of a water inlet valve to the tank in accordance with the water level in it such that the rate of inflow is less than the rate of outflow to prevent hunting of the inflow control; to thermostatically control the energization of electric heating elements in the tank; to energize continuously a heater element in the tank to compensate for heat loss; and to facilitate servicing of the apparatus by mounting on a replaceable panel on the tank cover the motor driven pump and its timer, the inlet water valve and the water level control, the heating elements and thermostat controls, and the continuously energized heater.

In the drawings:

FIG. 3 is a view, in end elevation, at an enlarged scale, of the coffee brewer taken looking from right to left of FIG. 2.

FIG. 4 is a vertical sectional view, at an enlarged scale, taken generally along line 4—4 of FIG. 1.

FIG. 5 is a vertical sectional view through a portion of one of the coffee extract receptacles showing the manner in which the cover and funnel are mounted thereon together with the funnel cover and the swing spout.

FIG. 6 is a plan view taken generally along line 6—6 of FIG. 5.

FIG. 7 is a top plan view of the funnel.

FIG. 8 is a vertical sectional view taken generally along line 8—8 of FIG. 7.

FIG. 9 is a vertical sectional view taken generally along line 9—9 of FIG. 8.

FIG. 10 is a top plan view of the spray head.

FIG. 11 is a vertical sectional view taken generally along line 11—11 of FIG. 10.

2

Figure 15:
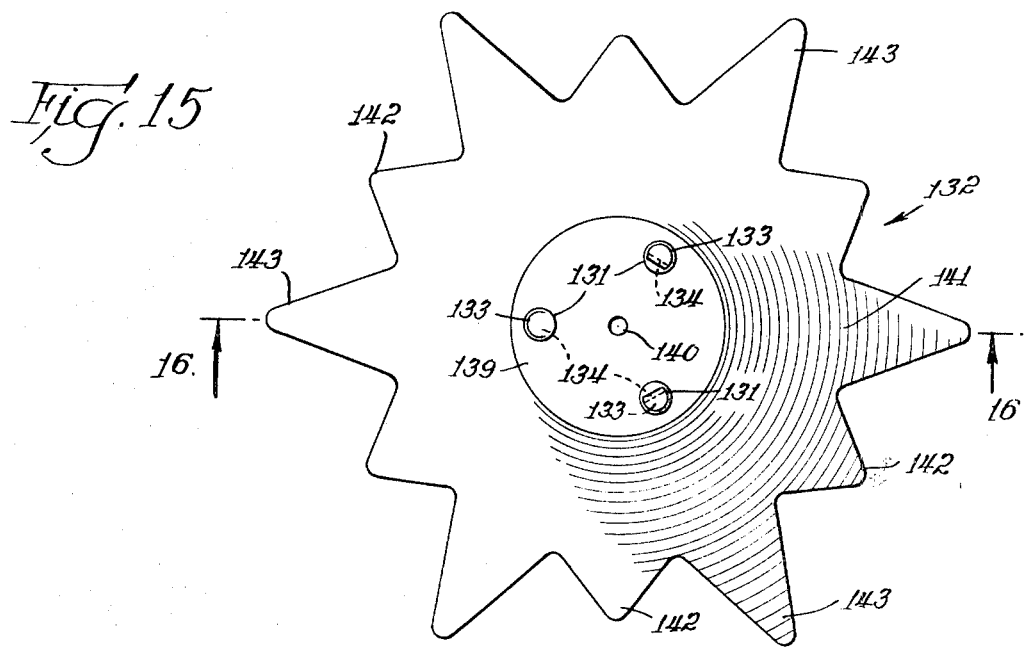

FIG. 15 is a top plan view of a modified spray head.

Figure 16:
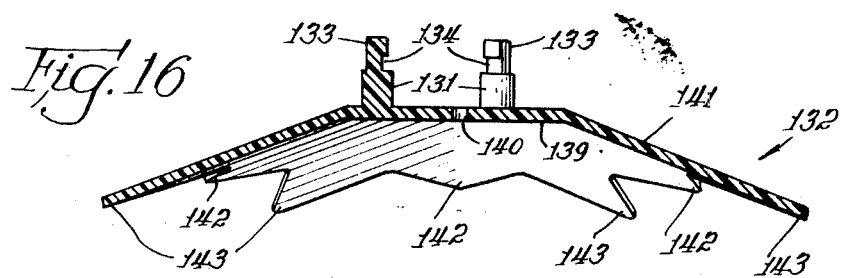

FIG. 16 is a vertical sectional view taken along line 16—16 of FIG. 15.

In FIGS. 1—4 of the drawings the reference character 10 designates, generally, an urn-type coffee brewer in which this invention is embodied. The coffee brewer 10 includes a generally rectangular hot water tank 11 that is formed preferably of stainless steel. It has a cover 12 of like material with which are integrally formed cylindrical coffee extract receptacles 13 and 14. The tank 11 is arranged to be filled nearly to its top with hot water 15 in a manner to be described presently. In the formation of the cover 12 and coffee extract receptacles 13 and 14 the junction therebetween is formed with an annular convex rim 16, FIG. 5, that is arranged to receive a plastic cover which is indicated, generally, at 17.

The plastic cover 17 has an annular concave rim 18 which overlies the respective convex rim 16, it being understood that each of the receptacles 13 and 14 is provided with a plastic cover 17. Each plastic cover 17 has an upstanding cylindrical section 19 which extends inwardly and downwardly through a downwardly stepped section 20 into the upper portion of the respective coffee extract receptacle 13 or 14. The section 20 terminates in a downwardly inclined bottom 21 having a central aperture 22.

For coffee brewing purposes a plastic funnel, indicated generally at 24 is employed. The details of construction of the plastic funnel 24 are shown more clearly in FIGS. 6—8 of the drawings. The plastic funnel 24 includes an upstanding cylindrical section 25 which, when in place, constitutes an upward extension of the upstanding cylindrical section 19 of the underlying plastic cover 17. The upstanding cylindrical section 25 has a downwardly stepped section that is indicated, generally, at 26 which extends downwardly and inwardly from its lower end and overlies the downwardly stepped section 20 of the plastic cover 17. The plastic cover 17 and the plastic funnel 24 are so constructed and arranged that they have only limited area contact as indicated at 27 while, as indicated at 28, the downwardly stepped sections 20 and 26 are spaced slightly apart. Because of the large sections of plastic material involved it is impractical to undertake to have the stepped sections 20 and 26 in engagement over their entire juxtaposed areas.

The plastic funnel 24 is arranged to receive a paper filter 29 on which ground coffee 30 is placed in conventional manner to receive hot water from the tank 11 in a manner to be described.

Near its upper end the section 25 of the plastic funnel 24 has an integral outstanding flange 31 from which, as shown in FIGS. 7 and 8, a handle 32 extends radially. The handle 32 is generally of inverted U-shape and it has an integral central rib 33 as shown in FIG. 9. On the side of the plastic funnel 24 opposite the handle 32 there is a radial flange extension 34. The arrangement of the handle 32 and flange 34 is such as to facilitate two hand manipulation of the plastic funnel 24. When it is recalled that the plastic funnel 24 is relatively large and, when it is necessary to remove it with the spent ground coffee 30, it is relatively heavy. It is to take care of this situation that provision is made for the two hand manipulation.

The downwardly stepped section 26 of the plastic funnel 24 terminates in a downwardly inclined bottom 35 having upstanding ribs 36. They are provided in order to space the lower portion of the paper filter 29 from the bottom 35 when the paper filter 29 has been wetted by the inflow of hot water during the brewing cycle. A central aperture 37 in the bottom 35 in register with the aperture 22 in the bottom 21 of the plastic cover 17 provides for the the outflow of coffee extract into the body of the same as indicated at 38 in FIG. 5. The brewing cycle is so adjusted that the maximum level of the coffee extract 38 is as indicated at 39 which is a slight distance below the aperture 37 in the plastic funnel 24.

In FIG. 5 a plastic funnel cover, indicated generally at 43, overlies the plastic funnel 24. In the absence of the plastic funnel 24, FIG. 2, the plastic funnel cover 43 overlies the plastic cover 17 which closes off the top of the coffee extract receptacle 13. The plastic funnel cover 43 has a depending peripheral flange 44 which overlies the upper edge of the cylindrical section 25 of the plastic funnel 24. Spaced inwardly from the flange 44 is a rib 45 which depends from the underside of the funnel cover 43. Its purpose is to direct the flow of condensate which collects on the underside of the cover 43 into the interior of the plastic funnel 24. Formed integrally with the central portion of the funnel cover 43 is an upstanding cup-shaped formation 46. It has vertical exterior ribs 47 to facilitate its being grasped manually when the cover 43 is to be removed or replaced. Intermediate the ends of the cup-shaped formation 46 is a downwardly inclined partition 48 having a central opening 49 through which hot water can flow that is delivered from a swing spout 50 in a manner to be described. A sanitary plastic cover 51 is carried by the distal end of the swing spout 50 for the purpose of overlying the open upper end of the cup-shaped formation 46. Upstanding flanges 52, integral with the body of the cover 51, facilitate manual swinging movement of the cover 51 and the swing spout 50 to which it is attached from one to the other of the two brewing positions.

In FIG. 6 it will be noted that arcuate slots 55 are formed in a flat central portion 56 of the partition 48. The slots 55 are arranged to receive upstanding pins 57 from a spray head that is indicated, generally, at 58 and is preferably formed of stainless steel. The details of construction of the spray head 58 are shown more clearly in FIGS. 10 and 11. The upper ends 60 of the pins 57 are generally semicircular with shallow notches 61 therebelow The semicircular upper ends 60 are arranged to extend through correspondingly shaped openings 62 at the ends of the slots 55. After the upper ends 60 of the pins 57 are inserted in the openings 62 at the ends of the slots 55, the spray head 58 is rotated through a relatively small distance to bring the notches 61 into registry with flanges 63 along the inner sides of the slots 55. Continued movement of the spray head 58 in the same direction causes the upper ends 60 to move past detents 64 on the sides of the slots 55 opposite the flanges 63 and into end portions 65 of the slots 55 where they are securely held in position. The reason for detachably mounting the spray head 58 on the underside of the funnel cover 43 is to facilitate inspection and cleaning of the under surface of the funnel cover 43 above the spray head 58 as well as to facilitate inspection and cleaning of the upper side of the spray head 58 itself. By reversing the movement of the spray head 58, it can be detached from the funnel cover 43.

As shown in FIGS. 10 and 11 the spray head 58 is formed with radial flutes 66 for the purpose of directing the flow of hot water radially outwardly into the upper end of the funnel 24. In order to more uniformly distribute the flow of hot water the spray head 58 has a scalloped periphery 67.

Figure 1:
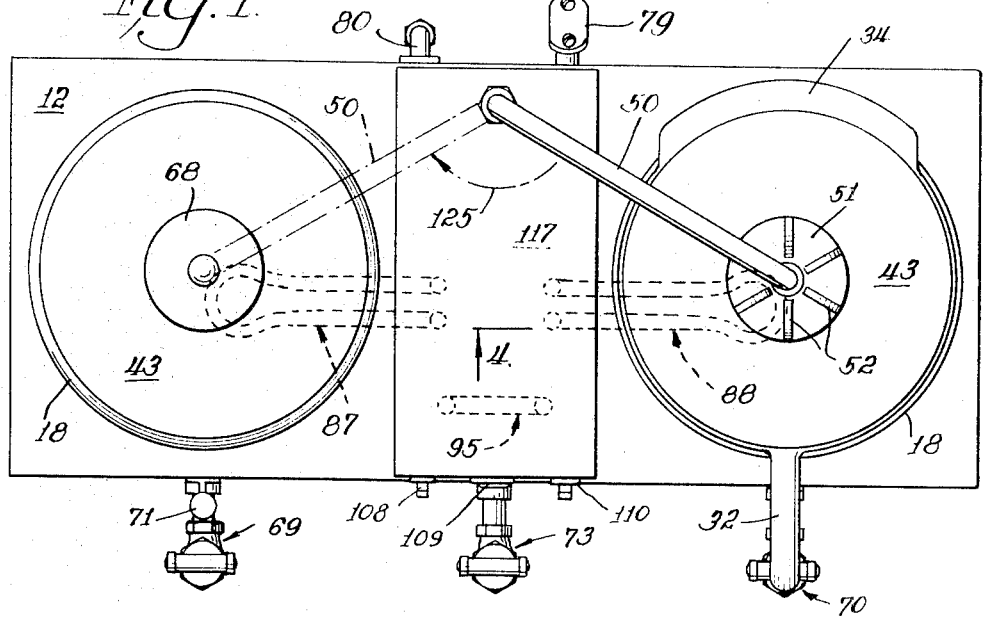
FIG. 1 is a top plan view of an urn-type coffee brewer embodying this invention.
Figure 2:
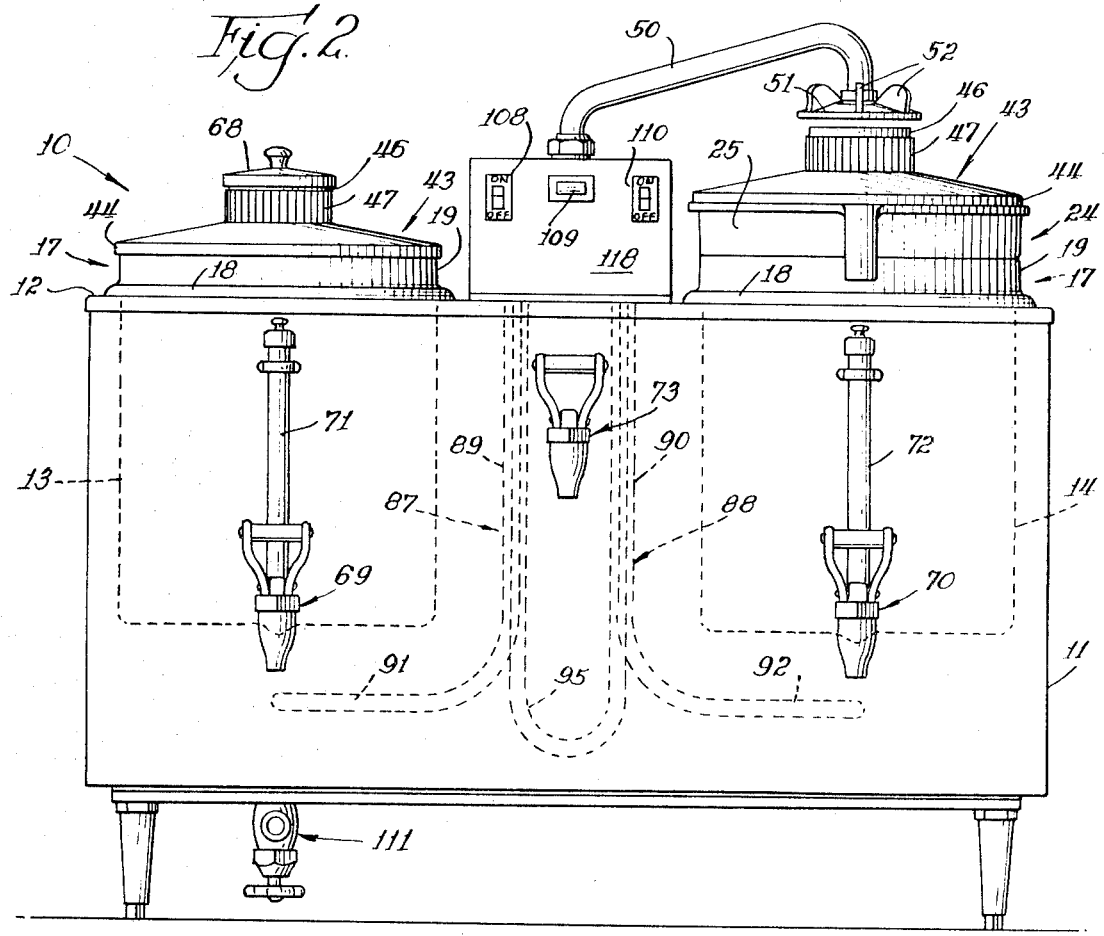
FIG. 2 is a view, in front elevation, of the coffee brewer shown in FIG. 1.

As shown in FIGS. 1, 2 and 4 a sanitary cover 68 is provided for closing the upper end of the central cup-shaped formation 46 on the funnel cover 43 that is not employed for actually covering the funnel 24.

For the purpose of withdrawing coffee extract from the receptacles 13 and 14 coffee extract faucets 69 and 70 are mounted on the front wall of tank 11. They are suitably connected, as shown in FIG. 3 to the lowermost portions of the receptacles 13 and 14. The level of the coffee extract in the receptacles 13 and 14 is shown by sight glasses 71 and 72 in conventional manner. A hot water faucet 73 is arranged to communicate directly with the interior of the tank 11 for the purpose of withdrawing hot water for tea making purposes and the like.

Figure 13:
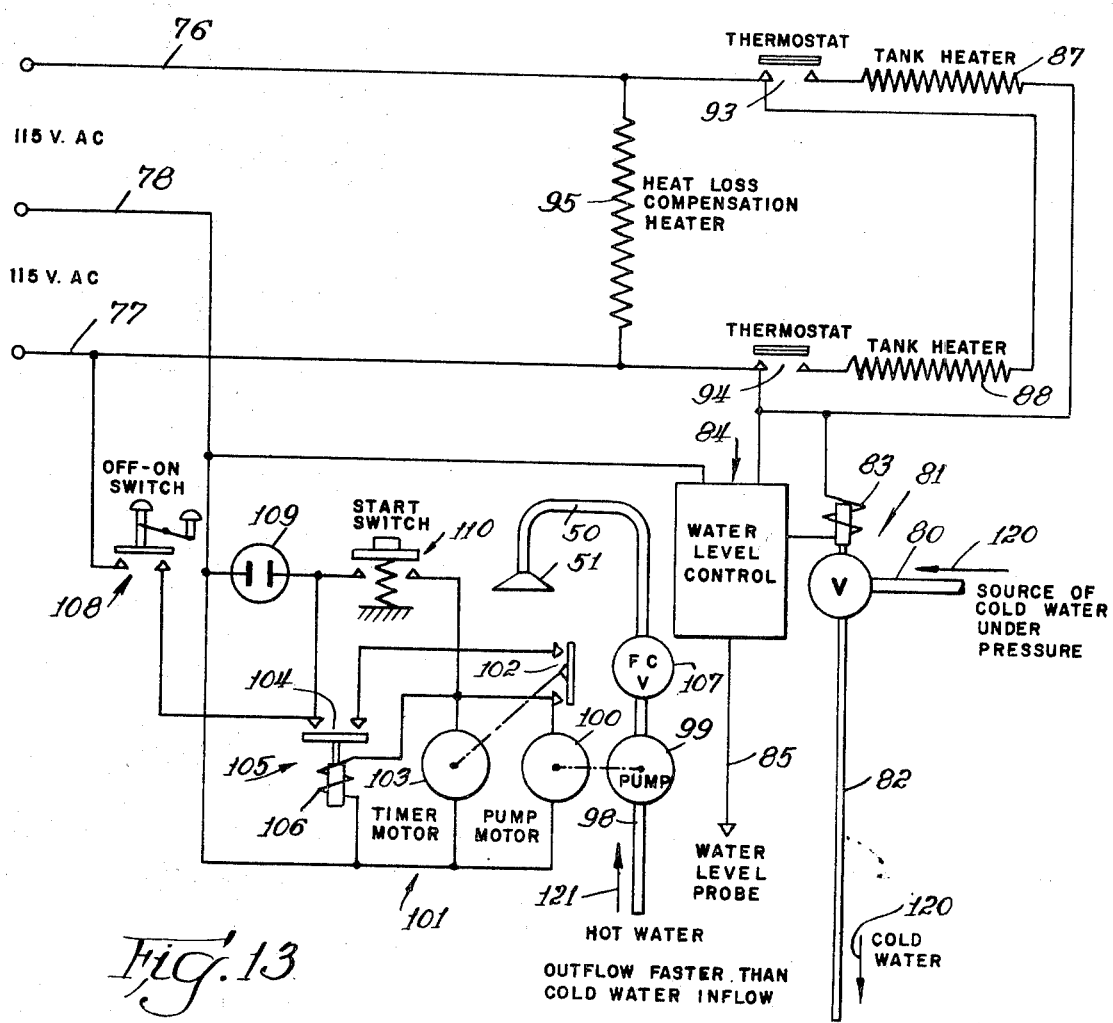
FIG. 13 shows, diagrammatically, the circuit connections that can be employed for the coffee brewer in which this invention is embodied.

FIG. 13 shows diagrammatically the various controls for the coffee brewer 10 and the circuit connections therefor. Here it will be noted that conductors 76 and 77 are connected to a suitable source of 115-volts alternating current with a neutral or ground conductor 78 therebetween. These conductors are connnected to the coffee brewer 10 through a conduit 79 which enters through the rear wall of the tank 10.

Cold water is supplied from a suitable source under pressure through a pipe 80 under the control of a solenoid valve that is indicated, generally, at 81. When the solenoid valve 81 is opened, cold water discharges through a pipe 82 into the tank 11 near the bottom thereof. For operating the solenoid valve 81 a winding 83 is provided. Its energization is under the control of a water level control device that is indicated, generally, at 84 and is of conventional construction. The water level control device includes a water level probe 85 which extends into the tank 11. The water level control device 84 operates independently of the brewing cycle and entirely under the control of the level of the hot water 15 in the tank 11. The normal water level is indicated at 86 in FIG. 5. This is the level of the water 15 when the brewing cycle is not being accomplished and further flow of cold water to the tank 11 is terminated.

For the purpose of maintaining the temperature of the water 15 in the tank 11 at the desired level tank heaters 87 and 88 are employed. Each of them is of U-shape having an L-configuration As shown in FIG. 2 the tank heaters 87 and 88 are arranged with their long arms 89 and 90 extending vertically downwardly from the central portion of the cover 12 while the short arms 91 and 92 extend horizontally underneath the receptacles 13 and 14. Referring again to FIG. 13 it will be noted that thermostat contacts 93 and 94 control the energization of the tank heaters 87 and 88, respectively, by connecting and disconnecting them to and from the conductors 76 and 77.

In addition to the tank heaters 87 and 88 which are energized according to the temperature of the water 15 in the tank 11 there is provided a heat loss compensation heater 95 that is permanently connected between the conductors 76 and 77. The heater 95 is arranged to compensate for heat loss from the tank 11 not due to withdrawal of hot water 15 therefrom. When the heater 95 is employed, it is unnecessary for the tank heaters 87 and 88 to be energized other than to restore the temperature of the water 15 to the desired value as a result of the brewing operation and the introduction of cold water under the control of the solenoid valve 81.

For supplying hot water to perform the brewing operation a hot water pipe 98 is employed. It extends into the tank 11 and into the water 15 but at a point remote from the lower end of the discharge water pipe 82. The hot water is removed from the tank 11 by a pump 99 which is driven by a pump motor 100. The pump 99 and the motor 100 constitute an assembled unit with the pump 99 being located below the level 86 of the hot water 15 in the tank 11. The pump motor 100 is energized during a predetermined interval that is controlled by a timer that is indicated, generally, at 101. The timer 101 includes normally open contacts 102 that are arranged to be controlled by a timer motor 103. For controlling the operation of the timer 101 normally open contacts 104 of a relay, shown generally at 105, are employed. The relay 105 includes a winding 106.

The pump 99 is arranged to supply hot water from the tank 11 to the swing spout 50. The hot water flows through a flow control valve 107. The operation of the solenoid valve 81, of the pump 99 and flow control valve 107 is such that hot water flows from the tank 11 faster than cold water flows into the tank 11. As a result, during the brewing cycle the solenoid valve 81 under the control of the water level control device 84 does not repeatedly open and close in an attempt to maintain the water level 86 in the tank 11 at the maximum height. Rather, during the brewing cycle, cold water continues to flow into the tank 11. The length of the brewing cycle is such that the temperature of the hot water supplied by the pump 99 remains substantially unaffected by the continued flow of cold water into the tank 11.

It will be recalled that the energization of the tank heaters 87 and 88 and of the heat loss compensation heater 95 is independent of the brewing cycle and controls therefor. For initiating the operation of the pump motor 100, timer 101 and relay 105 there is provided an OFF-ON switch that is indicated, generally, at 108. Associated with it is a glow discharge indicating lamp 109. To start the brewing cycle there is provided a start switch that is indicated, generally, at 110.

Should it become necessary to drain the tank 11 a drain valve 111, FIGS. 2, 3 and 4 is mounted on the underside of the bottom of the tank 11. Ordinarily it is necessary to drain the tank 11 only in the event that it requires cleaning or the cover 12 and coffee extract receptacles 13 and 14 are required to be inspected and replaced. Except for the faucets 69, 70 and 73 all of the elements associated with the tank 11 are mounted on the cover 12 and those required to do so extend downwardly therefrom into the tank 11. Thus there is little likelihood that leakage can occur from the tank 11.

Figure 12:
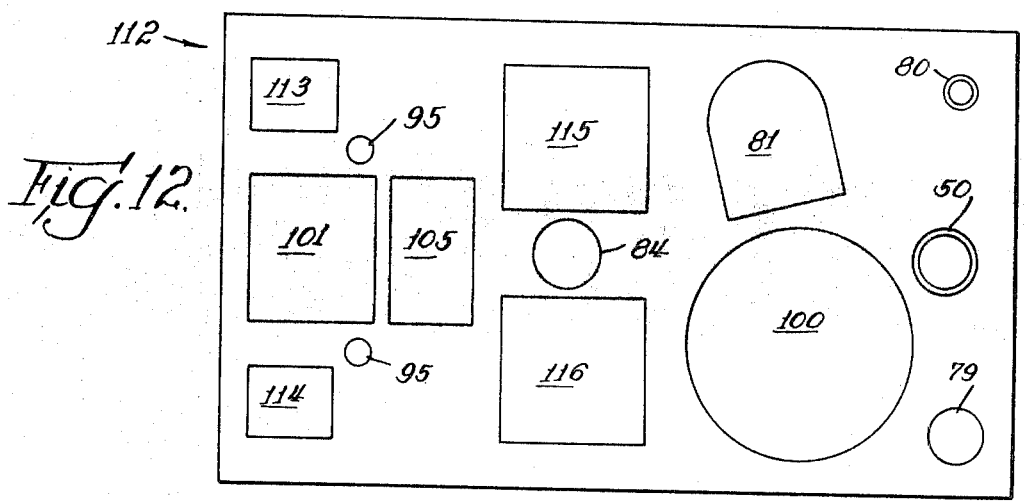
FIG. 12 is a top plan view of the removable panel showing the general location of the various components of the controls for the coffee brewer.

After continued use it is likely that some or all of the control elements shown in FIG. 13 may need to be repaired or replaced. In order to facilitate this the major portion of them is mounted on a replaceable panel that is indicated, generally, at 112 and, as shown in FIGS. 2 and 4, is located on the cover 12 midway its ends and between the receptacles 13 and 14. Mounted on the replaceable panel 112 are thermostats 113 and 114 which are arranged to control the opening and closing of the thermostat contacts 93 and 94. The thermostats 113 and 114 and other equipment mounted on the panel 112 are shown in FIG. 12 in outline form only since the actual configuration may vary depending upon the manufacturer of the particular device. It will be understood that suitable probes, not shown, extend from the thermostats 113 and 114 below the level 86 of the hot water 15 in the tank 11 in accordance with conventional practice. The tank heaters 87 and 88 are mounted on individual removable panels 115 and 116. The reason for this is to permit removal of the tank heaters 87 and 88 independently of the removal of the panel 112 since the short arms 91 and 92 of the tank heaters 87 and 88 normally extend underneath the receptacles 13 and 14. A cover 117 overlies the panel 112. For removal of the panel 112 it will be understood that the swing spout 50 is first removed and that the water connection to the solenoid valve 81 is disconnected. The electrical connections are disconnected through the use of suitable disconnecting terminals of conventional construction.

The front end of the cover 117 is closed by a removable front panel 118 on which the switches 108 and 110 and the indicating lamp 111 are mounted.

In operation, as shown in FIG. 13 cold water flows in the direction indicated by arrows 120 into the tank 11 when the solenoid valve 81 is opened. Its winding 83 is controlled by the water level control device 84 and the arrangement is such as to maintain the water level 86 of the water 15 in the tank 11 at the elevation indicated.

Before the brewing cycle is initiated a paper filter 29 is positioned in the plastic funnel 24 and a quantity of ground coffee 30 is placed on the filter 29. Then the funnel cover 43 is removed from the plastic cover 17 over the coffee extract receptacle in which a fresh supply of coffee extract is to be brewed. The funnel 24 is applied to the cover 17 and the funnel cover 43 is placed on top of the funnel 24. Then the swing spout 50 is shifted to the brewing position. Next the OFF-ON switch 108 is closed to complete an obvious energizing circuit for the glow discharge indicating lamp 109. Then the start switch 110 is depressed momentarily to complete a circuit from conductor 77 through the contacts of switch 108 to the pump motor 100, timer motor 103 and the winding 106 in parallel. Energization of the winding 106 closes contacts 104 and energization of the timer motor 103 closes contacts 102 to provide a holding circuit and permit release of the start switch 110. The pump motor 100 drives the pump 99 to supply a predetermined quantity of hot water for the brewing cycle which is determined by the operation of the timer 101. At the end of the predetermined interval, the timer motor 103 opens contacts 102. This deenergizes the pump motor 100, timer motor 103 and winding 106 of the relay 105. The timer 101 then is automatically reset so that the cycle can be completed subsequently. On operation of the pump 99 hot water flows in the direction indicated by arrow 121 through the pipe 98 and the flow control valve 107 to the swing spout 50. It flows from the swing spout 50 as shown in FIG. 5 and indicated by arrows 122 through the opening 49 in the flat central portion 56 of the partition 48. The hot water flows onto the spray head 58 and is thereby distributed as indicated by arrows 123 over the ground coffee 30. The coffee extract thus formed flows downwardly as indicated by arrow 124 into the receptacle 14, for example, in a relatively high velocity stream. Because of this it continuously mixes with the previously brewed coffee extract 38 and thus requires no agitation to provide a uniform mixture.

Assuming that the brewing operation was performed as described above in connection with the receptacle 14, after it has been completed the funnel cover 43 overlying the cover 17 on the receptacle 13 is removed and the spout 50 is swung as indicated by arrow 125 in FIG. 1 to overlie the receptacle 13. The brewing cycle then is duplicated as described above. On its completion the sanitary cover 68 is replaced on the central cup shaped formation 46.

Figure 14:
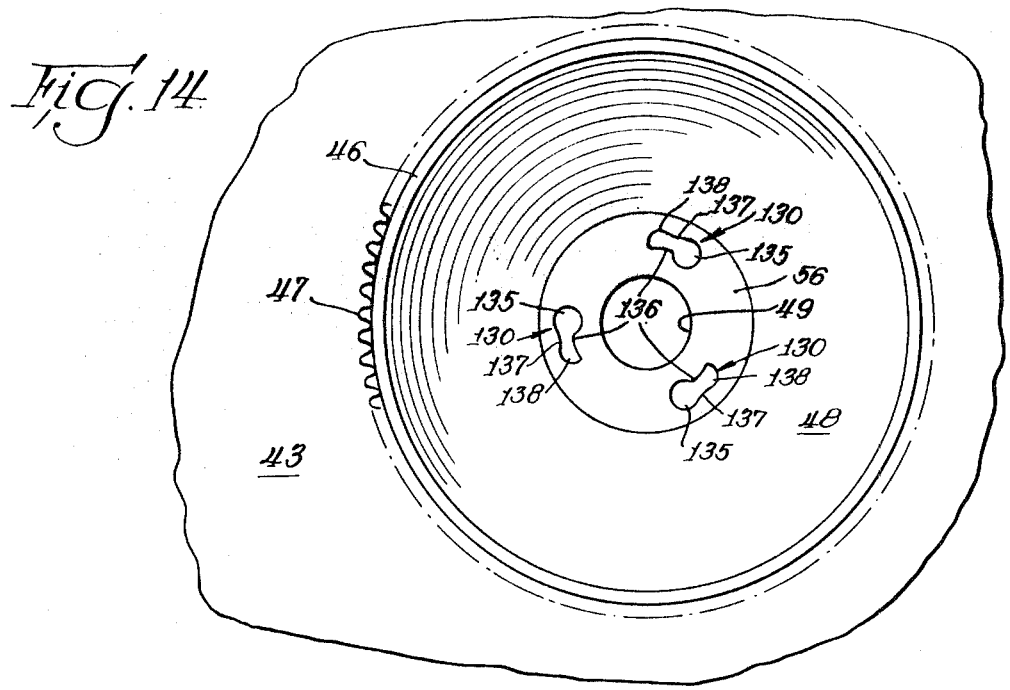
FIG. 14 is a top plan view of a modified portion of the central part of the funnel cover.

FIGS. 14, 15 and 16 show a modified form of spray head and arrangement for detachably mounting it on the funnel cover 42. In FIG. 14 it will be noted that arcuate slots 130 are formed in the partition 48 and more particularly in the flat central portion 56 thereof. The arcuate slots 130 are arranged to receive upstanding pins 131 that are formed integrally with a spray head that is indicated, generally at 132 and preferably is formed of a thermoplastic. The upper ends 133 of the upstanding pins 131 are semicircular and are provided with shallow notches 134 therebelow. The semicircular ends 133 are arranged to be inserted in openings 135 at the ends of the arcuate slots 130. Then the spray head 132 is pivoted slightly to cause the notches 134 to pass by flanges 136 and beyond detents 137 into end portions 138 of the arcuate slots 130. When so located the spray head 132 is firmly head in place. By reverse pivotal movement of the spray head 132 it can be removed.

The spray head 132 is formed with a flat central portion 139 that has a central opening 140 therein through which some of the hot water can flow onto the ground coffee 30 in the funnel 24. Extending downwardly and outwardly from the flat central portion 139 is a frustoconical surface 141 over which the hot water also flows to be distributed over the ground coffee 30 principally from the tips of relatively short serrations 142 and the tips of relatively long serrations 143. It has been found that the hot water tends to flow principally from the tips of the serrations 142 and 143. Since they are located at different radial distances from the center of the spray head 132, the hot water is sprayed over the principal area of the ground coffee 30.

The embodiments of the spray heads 58 and 132 disclosed herein are disclosed and claimed in our copending application Ser. No. 59,296, filed July 29, 1970.

What we claim as new is:

1. Coffee making apparatus comprising:
    a tank for containing hot water,
    a metallic cover for said tank having a pair of coffee extract receptacles formed integrally therewith each having a convex rim,
    a plastic receptacle cover for each receptacle having a downwardly stepped apertured central portion and concave rim for overlying the respective convex rim,
    at least one plastic funnel having a downwardly stepped apertured central portion conforming generally to said central portion of said receptacle cover and adapted to receive a ground coffee carrying filter,
    a plastic funnel cover for said funnel adapted to overlie said receptacle cover absent said funnel,
    a spray head carried by said funnel cover, and means for delivering hot water from said tank to said spray head.

2. Coffee making apparatus according to claim 1 wherein said receptacle cover and said funnel have limited area contact engagement.

3. Coffee making apparatus according to claim 2 wherein said limited area contact engagement is along peripheral portions of said cover and funnel.

4. Coffee making apparatus according to claim 1 wherein said funnel has an integral handle extending radially from its upper portion and a diametrically opposite radial flange to facilitate two handed manipulation.

5. Coffee making apparatus according to claim 1 wherein said funnel cover has annular depending rib means along its periphery to cause condensate on the underside to drip into said funnel or said receptacle cover as the case may be.

6. Coffee making apparatus according to claim 1 wherein: said funnel cover has an integral central upstanding cup shaped formation with an aperture in the bottom, and means mount said spray head underneath the last mentioned aperture.

7. Coffee making apparatus according to claim 6 wherein means detachably secure said spray head to said funnel cover.

8. Coffee making apparatus according to claim 1 wherein means controlled in accordance with the level of water in said tank supply water thereto at a lesser rate than hot water is delivered to said spray head from said tank.

9. Coffee making apparatus according to claim 1 wherein:
said hot water delivering means includes a pump, and
means control the time during which said pump is operated for each coffee brewing cycle.

10. Coffee making apparatus according to claim 1 wherein:
water inlet valve means control flow of water to said tank,
means responsive to the level of water in said tank control operation of said water inlet valve means,
electric heater means supply heat to water in said tank,
thermostat means control energization of said electric heater means to maintain said water at a predetermined temperature,
said hot water delivering means includes an electric motor driven pump, and
timer means control the time during which said electric motor driven pump is operated for each brewing cycle.

11. Coffee making apparatus according to claim 10 wherein:
a removable panel is mounted on said metallic cover for said tank, and
means mount said means specified in claim 11 on said panel between said coffee extract receptacles.

12. Coffee making apparatus according to claim 11 wherein:
said electric heater means comprises a pair of generally L-shaped heater elements with the short arm of each underlying one of said coffee extract receptacles, and
means removably mount said electric heater means on said panel.

13. Coffee making apparatus according to claim 11 wherein flow control valve means on said panel control the rate at which said pump delivers hot water to said spray head.

14. Coffee making apparatus according to claim 11 wherein said electric heater means includes a heater adapted to be energized continuously to compensate for heat loss from said tank.